US005805396A

United States Patent [19]
Sado et al.

[11] Patent Number: 5,805,396
[45] Date of Patent: Sep. 8, 1998

[54] PROTECTION CIRCUIT OF DRIVE SYSTEM FOR MOTOR

[75] Inventors: Hitoshi Sado; Hiroyo Saitoh, both of Kohnan-machi, Japan

[73] Assignee: Zexel Corporation, Tokyo, Japan

[21] Appl. No.: 716,872

[22] Filed: Sep. 20, 1996

[30] Foreign Application Priority Data

Sep. 25, 1995 [JP] Japan .................................. 7-270604

[51] Int. Cl.[6] ...................................................... H02H 3/00

[52] U.S. Cl. ............................................... 361/42; 361/31

[58] Field of Search ................................ 361/18, 24, 31, 361/93, 42–50; 323/274–277, 284; 307/9.1, 10.1, 10.6, 10.7

[56] References Cited

U.S. PATENT DOCUMENTS 4,725,912 2/1988 Wrathall .................................. 361/18
5,166,852 11/1992 Sano ......................................... 361/42

*Primary Examiner*—Jeffrey A. Gaffin
*Assistant Examiner*—Michael J. Sherry
*Attorney, Agent, or Firm*—Wenderoth, Lind & Ponack

[57] ABSTRACT

A grounded terminal of a motor driver for controlling an actuator motor is connected to a ground terminal of a control unit through a grounded wire, and therefore connected to a grounded point. Since a ground wire of the stabilized power supply circuit is connected to the ground wire of the control unit, the stabilized power-supply circuit also has its ground connected with the grounded point disposed outside the control unit. A cut-wire avoidance diode is connected between the ground wire of the stabilized power supply circuit and a power transistor unit in a manner such that its cathode is connected to the power transistor unit, which enables the stabilized power-supply circuit to remain grounded even when the control unit is disconnected from the grounded point.

15 Claims, 3 Drawing Sheets

REGULATOR CIRCUIT
31
12
30
IC
1
CONTROL UNIT
1b
13
14
4b
8
4c
B
OUTPUT
CIRCUIT
4
7
9a
CONTROL
CIRCUIT
M
3
6
9b
2
M
MOTOR
DRIVER
FAILURE
DETECTION
CIRCUIT
4a
5
POWER
TRANSISTOR
DRIVE
CIRCUIT
POWER
TRANSISTOR
UNIT
10
11
A

PROTECTION CIRCUIT OF DRIVE SYSTEM FOR MOTOR

BACKGROUND OF THE INVENTION

1. Field of the Invention

The present invention relates to a protection circuit for preventing an electronic circuit from being damaged by over-current due to short circuits and like failures in the circuits. Specifically, the present invention relates to a protection circuit for a drive system of an electric motor for preventing the drive system from being damaged by over-current.

2. Description of the Related Art

In an electronic circuit, when an abnormal electrical connection is made due to some accidental connection between a live wire (carrying a relatively large current) and ground, the current often builds up to a dangerous level, damaging the circuit. When such a danger is present, it is often necessary for the electronic circuit to have a suitable protection circuit which prevents the electronic circuit from being damaged when the current builds up to such a dangerous level.

For example, FIG. 2 shows a part of an electronic circuit constituting vehicle air-conditioning equipment. Such a circuit presents a typical example of over-current failures.

The circuit of FIG. 2 is for driving a blower of a vehicle's air-conditioning equipment, and also for moving an air-conditioning door (a typical example of which is an air-mix door and the like) to a desired position. FIG. 2 illustrates the connections of a blower motor 2 with a control unit 1 and the connections of an actuator motor 3 with the control unit 1.

The control unit 1 includes a motor driver 4 for controlling the operation of actuator motor 3 and a power-transistor drive circuit 5 for driving the blower motor 2.

The motor driver 4 includes a failure detection circuit 6 for detecting a failure of the circuit, a control circuit 7, and an output circuit 8. The output circuit 8 is constructed so as to issue a drive current to the actuator motor 3 causing it to rotate in either the forward or the reverse direction. The actuator motor 3 is connected outside the control unit 1 to the output circuit 8 through a pair of output terminals 9*a* and 9*b* provided in the control unit 1.

An output terminal of the power-transistor drive circuit 5 is connected to an input terminal of a power-transistor unit 10 disposed outside the control unit 1. This power-transistor unit 10 includes a power transistor and a heat sink on which the power transistor is mounted. In construction, the power-transistor unit 10 and the blower motor 2 are connected in series between a predetermined electric power source and ground.

The motor driver 4 includes a failure detection circuit 6 for detecting a failure in the motor driver 4, a control circuit 7, and the output circuit 8. All of the circuits 6, 7, and 8 have their grounded sides connected to a ground terminal 4*a* of the motor driver 4. The ground terminal 4*a* is further connected with an external grounded point "A" through a ground wire 11 inside the control unit 1.

The dotted marks "X" in FIG. 2 indicate some failure in the electrical connection between the ground terminal 4*a* and the ground wire 11 in the ground wire 11 itself, or in a position between the control unit 1 and the grounded point "A". Such failures result from, for example, cut wires, burnouts, or abnormal connection. When such failure occurs, the ground potential of the motor driver 4 becomes unstable causing many disadvantageous conditions, such as abnormal operation of the failure detection circuit 6, unstable operation of the actuator motor 3, etc. Further, since the output terminals 9*a* and 9*b* of the motor driver 4 have their parts exposed to the outside of the control unit 1, there is a danger that one of the terminals 9*a* or 9*b* may become short-circuited to ground due to some accident or that the terminals 9*a* and 9*b* may short to each other. When the output terminal 9*b* of the motor driver 4 is short-circuited to ground, over-current flows from the power supply to ground through a transistor in the output circuit 8 of the motor driver 4, as indicated by the dotted arrow of FIG. 2.

When the output terminal 9*b* of the motor driver 4 is accidentally connected to ground through a conductive member that introduces resistance therebetween, a voltage drop is caused along the conductive member causing over-current to flow in a direction indicated by the dotted arrow of FIG. 2. In FIG. 2, the voltage drop is represented by a dc power source, surrounded by a dotted line, inserted in series between the output terminal 9*b* and ground. Such over-current may damage components of the output circuits 8 by overheating or burning them out. In order to prevent the circuit from being damaged by the over-current, a conventional regulator circuit is disposed between the control unit 1 and the power supply to regulate such over-current.

FIG. 3 shows an example of a conventional regulator circuit. A conventional regulator circuit 30, which is provided between a power-supply terminal 1*b* of the control unit 1 and a power-supply line 12, is essentially constructed of an IC 31 for stabilizing a dc voltage. The IC 31 is an integrated three-terminal regulator, which stabilizes an input voltage supplied from the power-supply line 12 and also stabilizes its output voltage.

An output voltage of this regulator circuit 30 is applied to the power-supply terminal 1*b* of the control unit 1. In the control unit 1, the power-supply terminal 1*b* is connected to both the power-supply terminals 4*b* and 4*c* of the motor driver 4 through a diode 13 which protects the motor driver 4 from a reverse-polarity supply voltage (hereinafter referred to as the reverse-connection protective diode 13). The reverse-connection protective diode 13 is connected to a power supply wire 14 which is connected to various circuits (not shown) inside the control unit 1.

Even when the output terminal 9*b* of the motor driver 4 is short-circuited, causing current to pass through an abnormal path such as the one indicated by the dotted arrow of FIG. 3, it is possible to prevent electronic components from being seriously damaged since the regulator circuit 30 may prevent over-current from occurring in the circuit of FIG. 3.

In the construction shown in FIG. 3, it is necessary to provide the regulator circuit 30 separately from the control unit 1, and, therefore to provide an additional space for the regulator circuit 30. Further, since an additional grounded point "B" is required to ground the regulator circuit 30, an additional wiring is required to connect the regulator circuit 30 to the grounded point "B", thus complicating the assembly of the unit, and, thereby making the unit more expensive.

Further, in the above construction, though it is possible to prevent over-current from flowing through the circuit, the reverse-connection protective diode 13 provided in the power supply line of the control unit 1 has a voltage drop across it so that an output voltage issued from the output circuit 8 drops, causing the problem of cutting the operating range of the actuator motor 3.

Still further, in the above construction, since the reverse-connection protective diode 13 is wired in such a manner that the power is supplied from the cathode side of the diode

13 to various circuits (not shown) disposed inside the control unit 1, the cathode side of the diode 13 is substantially short-circuited when the output terminal 9*b* of the motor driver 4 is short-circuited, permitting a relatively large current, which is not over-current, to pass through the diode 13. As a result, the power-supply wire 14 for supplying the power to the various circuits (not shown) disposed in the control circuit 1 has a substantial voltage drop, making it difficult for the entire unit to operate normally.

SUMMARY OF THE INVENTION

It is an object of the present invention to provide a protection circuit for a drive system of an electric motor for preventing the drive system from being damaged or burnt out by over-current due to short circuits and like failures, and for grounding a stabilized power-supply circuit without fail.

It is another object of the present invention to provide a protection circuit for a drive system of an electric motor which does not require wiring an additional grounded point and the like outside the driver system of the motor.

It is further another object of the present invention to provide a protection circuit for a drive system of an electric motor which does not affect the operating range of the motor when operated.

The protection circuit of the present invention includes a control unit for controlling a drive circuit of an electric motor and a power transistor unit for supplying a drive current to the motor according to a signal issued from the control unit. According to a first aspect of the present invention, a stabilized power-supply circuit is provided inside the control unit to stabilize a voltage applied from the outside. The stabilized power-supply circuit has its ground connected to a ground terminal of the control unit. The first aspect of the present invention also provides a ground-break avoidance diode connected between the ground of the stabilized power-supply circuit and a connection between the power transistor unit and the control unit. The ground-break avoidance diode is situated in such a manner that the connection between the control unit and the power transistor unit is on the cathode side of the diode.

According to a second aspect of the present invention, the power transistor unit is constructed of a power transistor having its collector side connected to one of the lead wires of the motor and its emitter side connected to ground. The control unit issues a signal to the base side of the power transistor. The other lead wire of the motor is connected to a power supply side. According to a third aspect of the present invention, the power supplied to the remaining circuits of the control unit is conducted through a wire which branches off from an input stage of the stabilized power-supply circuit.

According to a fourth aspect of the present invention, a reverse-connection protective diode is provided between a terminal of the control unit and the input stage of the stabilized power-supply circuit. A voltage is applied from the outside to the terminal so as to be inputted to the stabilized power-supply circuit.

According to a fifth aspect of the present invention, the protection circuit includes a control unit for a vehicle's air-conditioning equipment. The control unit is provided with an actuator-motor drive circuit for controlling an actuator motor of the vehicle's air-conditioning equipment and a blower-motor drive circuit for controlling a blower motor. The protection circuit also includes a power transistor unit for supplying a drive current to the blower motor according to a signal issued from the control unit. The power transistor unit is disposed outside the control unit. The fifth aspect of the invention provides an improvement with respect to a stabilized power-supply circuit and a ground-break avoidance diode. The stabilized power-supply circuit is provided between a terminal of the control unit, to which terminal a power supply voltage is applied from the outside, and a power-supply wire of the actuator-motor drive circuit disposed inside the control unit. The stabilized power-supply circuit has its ground connected to a ground terminal of the control unit. A ground-break avoidance diode is connected between the ground of the stabilized power-supply circuit and a connection between the power transistor unit and the blower-motor drive circuit inside the control unit. The connection between the blower-motor drive circuit and the power transistor unit is on a cathode side of the diode.

According to a sixth aspect of the present invention, the power transistor unit is constructed of a power transistor having its collector side connected to one of the lead wires of the blower motor and its emitter side connected to ground. The control unit issues a signal to the base side of the power transistor. The other of the lead wires of the blower motor is connected to the power supply.

The third and fourth aspects of the invention, discussed above, can be realized with the vehicle air conditioning embodiment as well.

In the above construction of the present invention, the ground terminal of the control unit is connected with the outside portion well suited to be grounded, which enable circuits disposed inside the control unit to be grounded. Consequently, even when the ground terminal of this control unit is disconnected from a suitable grounded point on the outside, it is possible for at least the stabilized power-supply circuit to remain grounded through a path which is connected to the power transistor unit of the outside through the ground-break avoidance diode. In other words, even in the above case, it is possible to obtain a stabilized power supply voltage, which protects the drive circuit for controlling the electric motor from failures, the drive unit being disposed inside the control unit.

DESCRIPTION OF THE PREFERRED EMBODIMENTS

Hereinbelow, the present invention will be described in detail with reference to the accompanying drawings.

It is intended that all matters given in the following description and illustrated in the accompanying drawings shall be interpreted to be illustrative only and not as a limitation to the scope of the present invention, because many changes and modifications can be made to the following construction without departing from the spirit of the present invention.

Figure 1:
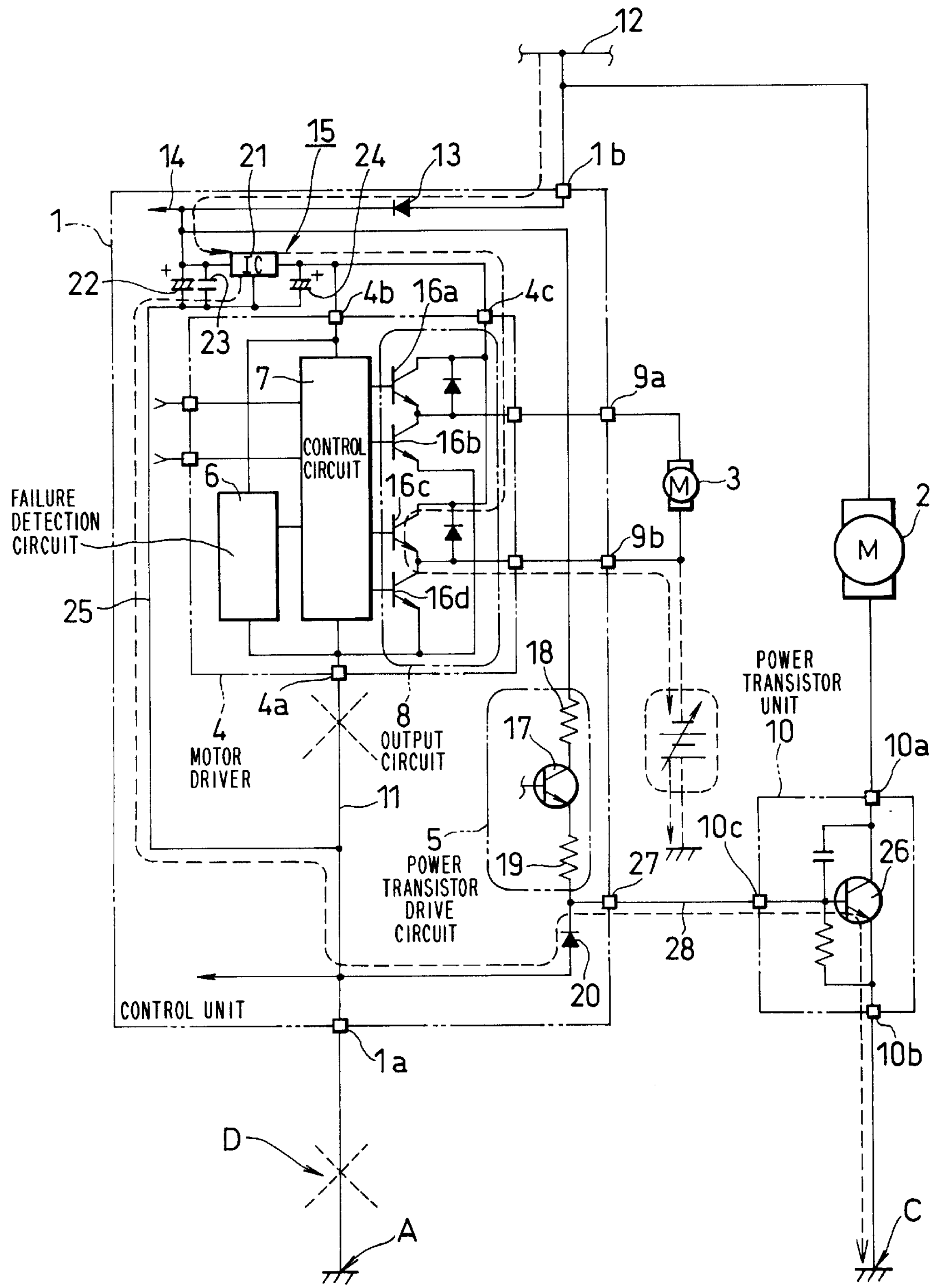
FIG. 1 is a circuit diagram of an embodiment of the protection circuit of the drive system of the electric motor according to the present invention.
Figure 2:
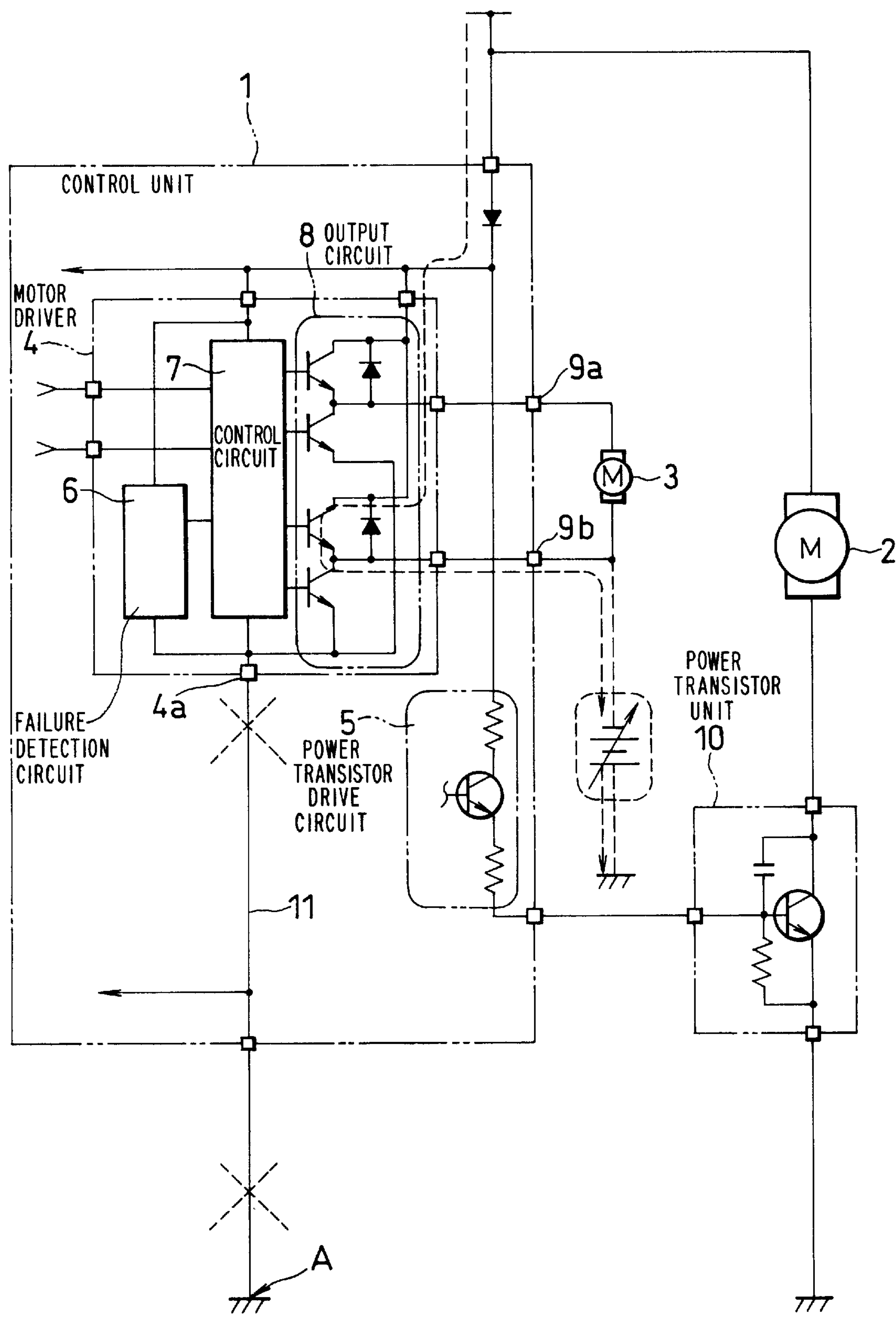
FIG. 2 is a circuit diagram of the conventional drive circuit for controlling the electric motor used in a vehicle's air-conditioning equipment.
Figure 3:
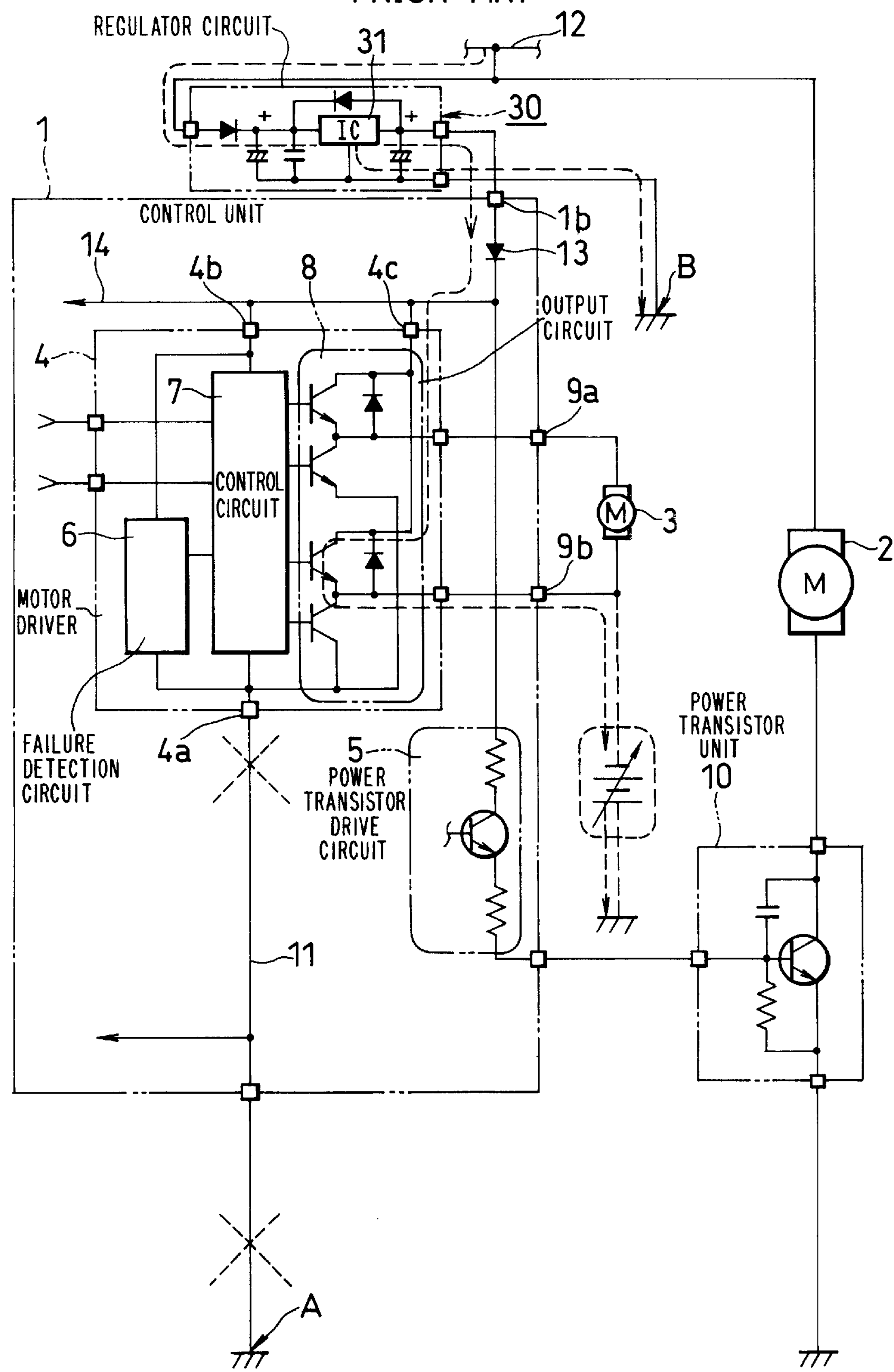
FIG. 3 is a circuit diagram of the conventional protection circuit for protecting the conventional drive circuit of the electric motor from failures.

In the drawings, like reference characters or numerals apply to similar parts throughout FIGS. 1 to 3.

In an embodiment of the present invention, a protection circuit of a drive system of an electric motor according to the present invention is applied to a control unit 1 of a vehicle's air-conditioning equipment.

The circuit shown in FIG. 1 represents a vehicle's air-conditioning equipment containing a protection circuit of a drive system of an electric motor according to an embodiment of the present invention. Specifically, FIG. 1 represents wiring between various components of the air-conditioning equipment such as a blower motor 2, an actuator motor 3 and the control unit 1 thereof. Outside the control unit 1, the blower motor 2 and the actuator motor 3, both controlled by the control unit 1, are connected to the control unit 1.

The control unit 1 is provided with a motor driver 4, a power-transistor drive circuit 5, a stabilized power-supply circuit 15 and other circuits (not shown) necessary for controlling the vehicle's air-conditioning equipment.

The motor driver 4 controls the actuator motor 3 for opening and closing an air-conditioning door (not shown), and is provided with a control circuit 7, an output circuit 8 and a failure detection circuit 6.

The control circuit 7 issues a signal for controlling the operation of the output circuit 8 in response to a control signal issued from one of the other circuits (not shown) of the control unit 1. The output circuit 8 permits a desired drive current to flow into the actuator motor 3 upon receipt of the signal issued from the control circuit 7.

In the embodiment of the present invention, this output circuit 8 is essentially constructed of four npn transistors 16*a,* 16*b,* 16*c* and 16*d.* Between a power-supply terminal 4*c* and a ground terminal 4*a* of the motor driver 4, are provided a first interconnection of two npn transistors 16*a,* 16*b* connected in series and a second interconnection of the remaining two npn transistors 16*c,* 16*d* connected in series. The first and second interconnections are connected with a first output terminal 9*a* and a second output terminal 9*b* of the control unit 1, respectively. Due to the above wiring, the actuator motor 3 is capable of rotating in either the forward or the reverse direction.

Upon detection of a failure in operation, a failure detection circuit 6 takes a necessary action, for example, to stop the operations of the circuit.

The power is supplied from a stabilized power-supply circuit 15 (described later) to both the failure detection circuit 6 and the control circuit 7 through a power-supply terminal 4*b* of the motor driver 4.

The failure detection circuit 6, control circuit 7, and the output circuit 8 are grounded through the ground terminal 4*a* of the motor driver 4. This ground terminal 4*a* is connected to a ground wire 11 provided inside the control unit 1. The ground wire 11 is connected to an external grounded point "A" through a ground terminal 1*a* provided inside the control unit 1.

The power transistor drive circuit 5 issues a bias current which is required to drive a power transistor unit 10 for driving the blower motor 2 which is disposed outside the control unit 1. In this power transistor drive circuit 5, the power supply voltage is applied to a collector of a transistor 17 through a transistor collector resistor 18. The collector resistor 18 has one of its terminals connected to a cathode side of a reverse-connection protective diode 13 which is connected in series between a power-supply terminal 1*b* of the control unit 1 and the stabilized power-supply circuit 15. The transistor 17 has its emitter connected to a power-unit connection terminal 27 of the control unit 1 though a transistor emitter resistor 19. The transistor 17 thus has its emitter connected to an input side of the power transistor unit 10 through the power-unit connection terminal 27, an external wire 28 and an input connection terminal 10*c.* Further, the emitter of the transistor 17 is connected to a cathode of a ground-break avoidance diode 20 which has its anode connected to the ground terminal 1*a* of the control unit 1

The stabilized power-supply circuit 15 is provided between the power-supply terminal 1*b* of the control unit 1 and the motor driver 4 to stabilize a voltage of the power supply, and functions to prevent over-current from flowing from the power supply into the motor driver 4 when a load is short-circuited or like failures occur in the circuit.

In the above embodiment of the present invention, the stabilized power-supply circuit 15 is not novel. That is, the circuit 15 has a conventional construction using a so-called three-terminal regulator IC 21.

The three-terminal regulator IC 21 is an integrated-circuit type stabilized power-supply circuit and has its input connected to the cathode of the reverse-connection protective diode 13, one of the terminals of an electrolytic capacitor 22 for insuring a constant voltage level, and one of the terminals of a noise suppression capacitor 23.

Incidentally, extended from a cathode side of the reverse-connection protective diode 13 is a power-supply wire 14 through which the power is supplied to various circuits (not shown) of the control unit 1.

The output of the three-terminal regulator IC 21 is connected to one of the terminals of an electrolytic capacitor 24 for insuring a constant voltage level, and the pair of power-supply terminals 4*b* and 4*c* of the motor driver 4.

Each of the electrolytic capacitors 22 and 24 and the noise suppression capacitor 23 has the other of its terminals connected to a ground wire 25 disposed inside the control unit 1. Also connected to this wire 25 is a ground side of the three-terminal regulator IC 21. The ground wire 25 is connected to the ground wire 11 which connects the ground terminal 4*a* of the motor driver 4 to the ground terminal 1*a* of the control unit 1.

The pair of output terminals of the motor driver 4 are connected to the output terminals 9*a* and 9*b* of the control unit 1 which are in turn connected to the actuator motor outside the control unit 1. A power supply line 12 is connected to the power-supply terminal 1*b* of the control unit 1.

The blower motor has one of its terminals connected to the power-supply line 12 and the other of its terminals connected to an output terminal 10*a* of the power transistor unit 10. This unit 10 has its ground terminal 10*b* connected to a grounded point "C".

The power transistor unit 10 is substantially constructed of a power transistor 26 provided with a heat sink, and permits a drive current to be supplied to the blower motor 2 when a control signal issued from the power transistor drive circuit 5 of the control unit 1 is inputted to a base of the power transistor 26 through the input terminal 10*c.* In the above construction, during normal operation, the actuator motor 3 rotates at a predetermined speed upon receipt of a drive current supplied from the output circuit 8 of the motor driver 4 through the output terminals 9*a* and 9*b* of the motor driver 4. On the other hand, the blower motor 2 is energized and rotates at a predetermined speed when the power transistor drive circuit 5 of the control unit 1 makes the power transistor 26 conductive in the power transistor unit 10.

In operation, when the output terminal 9*b* of the motor driver 4, for example, is short-circuited to ground due to some accident, the emitter of the transistor 16*c* in the output circuit 8 is directly grounded. As indicated by the dotted arrow in FIG. 1, an abnormally large current (which is larger than a current in normal operation) tends to flow from the power supply line 12 into the transistor 16*c* through the stabilized power-supply circuit 15. However, in the embodiment of the present invention, since the stabilized power-supply circuit 15 functions to limit such abnormally large current, it is possible to protect the transistors and like electronic components from damage.

An abnormal current, which is different from a current in normal operation, also appears when the output terminal 9*b* of the motor driver 4 is grounded through a component having an electrical resistance. In this case, a voltage drop appears across such component disposed between the output terminal 9*b* of the motor driver 4 and ground. This voltage drop is represented by a dc power supply surrounded by a dotted line in FIG. 1.

Further, even when such a short-circuiting problem occurs in operation, the power can be supplied to the remaining circuits (not shown) of the control unit 1 through the power-supply wire 14. This is possible because the power supply wire for the other circuits is connected upstream of the input of the stabilized power-supply circuit 15. Consequently, in contrast with the conventional case, there is no voltage drop in any of the remaining circuits (not shown) of the control unit 1. In other words, a predetermined voltage is applied to the remaining circuits of the control unit 1 in the present invention, which ensures normal operation of such remaining circuits (not shown) irrespective of whether the motor driver 4 is short-circuited.

Further, when a wire between the ground terminal 1*a* of the control unit 1 and the grounded point "A", for example, is cut at a position denoted by the reference character "D" due to some accident, the stabilized power-supply circuit 15 is connected with the grounded point "C" through the ground wire 25, the ground-break avoidance diode 20, the power transistor 26, and the ground terminal lob of the power transistor unit 10, as indicated in dotted line in FIG. 1. This makes it possible to ground the stabilized power-supply circuit 15 in case of a cut-wire at the position "D".

Consequently, even when the normally grounded wire between the ground terminal 1*a* of the control unit 1 and the grounded point "A" is cut, there is no danger that the stabilized power-supply circuit 15 will become unstable. In other words, it is possible for the stabilized power-supply circuit 15 to issue a stabilized dc voltage, irrespective of the above cut-wire accident. Therefore, the stabilized power-supply circuit 15 can supply a stabilized dc voltage even when the ground terminal 4*a* of the motor driver 4 is not grounded, which ensures normal operation of the motor driver 4.

Further, as shown in FIG. 3, in the conventional construction in which the regulator circuit is provided outside the control unit 1, since the reverse-connection protective diode 13 is inserted in a power-supply line for supplying the power to the motor driver 4 in the inside of the control unit 1, a voltage drop is produced across the diode 13, thereby reducing the available output voltage range that can be issued to the actuator motor 3. This available range is smaller than the desired range. As a result, the operating range of the actuator motor 3 is also reduced.

In contrast with this, in the embodiment of the present invention described above, since the output voltage issued from the stabilized power-supply circuit 15 is directly applied to the motor driver 4, there is no danger that a voltage drop will be produced in the output voltage applied to the actuator motor 3, thereby ensuring a normal operation range of the actuator motor 3 without fail.

As described above, in the present invention, even when the control unit 1, provided with the stabilized power-supply circuit 15, is disconnected from a normally arranged ground by accident, it is possible for the circuit 15 to remain grounded, and therefore to function normally. Consequently, it is possible to protect the drive circuit of the motor against failures.

Further, even when a cut-wire accident occurs in the drive circuit of the motor to which the stabilized power-supply circuit 15 supplies the power, it is possible to protect the drive circuit of the motor against damages, burnouts and like failures due to over-current, because the stabilized power-supply circuit 15 prevents such over-current from flowing into the drive circuit of the motor.

Still further, in the present invention, it is also possible to realize a cost reduction, because it is possible for the stabilized power-supply circuit 15 to remain grounded without providing any additional grounded portion on the outside of the control unit 1. Cost is also reduced since no additional assembly work or additional wiring materials are required outside the control unit 1.

What is claimed is:

1. A protection circuit for an electric motor control unit comprising:

a power supply terminal connectable to an external power source;

a ground terminal connectable to ground;

a power unit connection terminal;

a stabilized power supply circuit comprising, an input electrically connected to said power supply terminal, and a ground electrically connected to said ground terminal; and a ground-break avoidance diode comprising, an anode electrically connected to said ground of said stabilized power supply circuit and to said ground terminal, and a cathode electrically connected to said power unit connection terminal.

2. A protection circuit for an electric motor control unit as claimed in claim 1, comprising:

a reverse connection protective diode comprising, an anode electrically connected to said power supply terminal, and a cathode electrically connected to said input of said stabilized power supply circuit.

3. A protection circuit for an electric motor control unit as claimed in claim 2, comprising:

a power supply wire electrically connected at one side thereof to said cathode of said reverse connection protection diode and said input of said stabilized power supply circuit.

4. An electric motor drive system for use in controlling an electric motor comprising:

a control unit comprising, a power supply terminal connectable to an external power source;

a ground terminal connectable to ground, a power unit connection terminal, a stabilized power supply circuit comprising, an input electrically connected to said power supply terminal, and a ground electrically connected to said ground terminal, and a ground-break avoidance diode comprising, an anode electrically connected to said ground of said stabilized power supply circuit and to said ground terminal, and a cathode electrically connected to said power unit connection terminal; and a power transistor unit comprising, a power transistor having an emitter electrically connected to ground, and a base electrically connected to said power unit connection terminal of said control unit, and a collector electronically connectable to the electric motor.

5. An electric motor control unit as claimed in claim 4, wherein said ground-break avoidance diode provides an electrical path, through said power transistor unit, to ground for said stabilized power supply circuit.

6. An electric motor control unit as claimed in claim 4, wherein said control unit comprises:

a reverse connection protective diode comprising, an anode electrically connected to said power supply terminal, and a cathode electrically connected to said input of said stabilized power supply circuit.

7. An electric motor control unit as claimed in claim 6, wherein said control unit comprises:

a power supply wire electrically connected at one side thereof to said cathode of said reverse connection protection diode and said input of said stabilized power supply circuit.

8. An electric motor drive system comprising:

an electric motor comprising a plurality of lead wires, wherein one of said plurality of lead wires is connectable to an external power source;

a control unit comprising, a power supply terminal connectable to the external power source;

a ground terminal connectable to ground, a power unit connection terminal, a stabilized power supply circuit comprising, an input electrically connected to said power supply terminal, and a ground electrically connected to said ground terminal, and a ground-break avoidance diode comprising, an anode electrically connected to said ground of said stabilized power supply circuit and to said ground terminal, and a cathode electrically connected to said power unit connection terminal; and a power transistor unit comprising, a power transistor having an emitter electrically connected to ground, and a base electrically connected to said power unit connection terminal of said control unit, and a collector electrically connected to another of said plurality of lead wires of said electric motor.

9. An electric motor drive system as claimed in claim 8, wherein said ground-break avoidance diode provides an electrical path, through said power transistor unit, to ground for said stabilized power supply circuit.

10. An electric motor control unit as claimed in claim 8, wherein said control unit comprises:

a reverse connection protective diode comprising, an anode electrically connected to said power supply terminal, and a cathode electrically connected to said input of said stabilized power supply circuit.

11. An electric motor control unit as claimed in claim 10, wherein said control unit comprises:

a power supply wire electrically connected at one side thereof to said cathode of said reverse connection protection diode and said input of said stabilized power supply circuit.

12. A vehicle air conditioning drive system comprising:

a blower motor comprising a plurality of lead wires, wherein one of said plurality of lead wires is connectable to an external power source;

an actuator motor;

a control unit comprising, a power supply terminal connectable to the external power source;

a ground terminal connectable to ground, a power unit connection terminal, an actuator motor drive circuit electrically connected to said actuator motor, a blower motor drive circuit, a stabilized power supply circuit comprising, an input electrically connected to said power supply terminal, a ground electrically connected to said ground terminal, and an output electrically connected to said actuator motor drive circuit, and a ground-break avoidance diode comprising, an anode electrically connected to said ground of said stabilized power supply circuit and to said ground terminal, and a cathode electrically connected to said power unit connection terminal and to said blower motor drive circuit; and a power transistor unit comprising, a power transistor having an emitter electrically connected to ground, and a base electrically connected to said power unit connection terminal of said control unit, and a collector electrically connected to another of said plurality of lead wires of said blower motor.

13. An electric motor control unit as claimed in claim 12, wherein said ground-break avoidance diode provides an electrical path, through said power transistor unit, to ground for said stabilized power supply circuit.

14. An electric motor control unit as claimed in claim 12, wherein said control unit comprises:

a reverse connection protective diode comprising, an anode electrically connected to said power supply terminal, and a cathode electrically connected to said input of said stabilized power supply circuit and to said blower motor drive circuit.

15. An electric motor control unit as claimed in claim 14, wherein said control unit comprises:

a power supply wire electrically connected at one side thereof to said cathode of said reverse connection protection diode and said input of said stabilized power supply circuit.

* * * * *